Jan. 29, 1935.  E. A. GHAZAL  1,989,592
AUTOMOBILE WINDSHIELD GUARD
Filed July 20, 1933  2 Sheets-Sheet 1
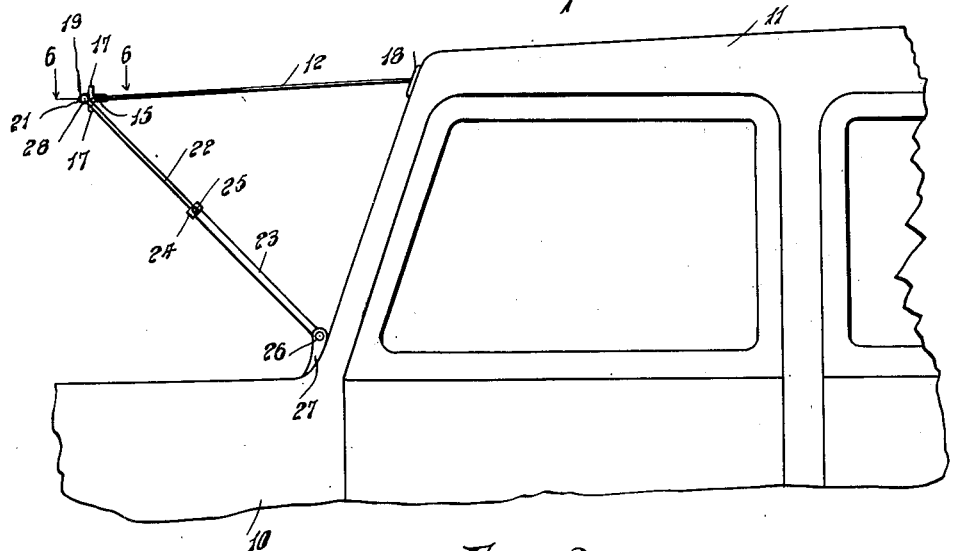
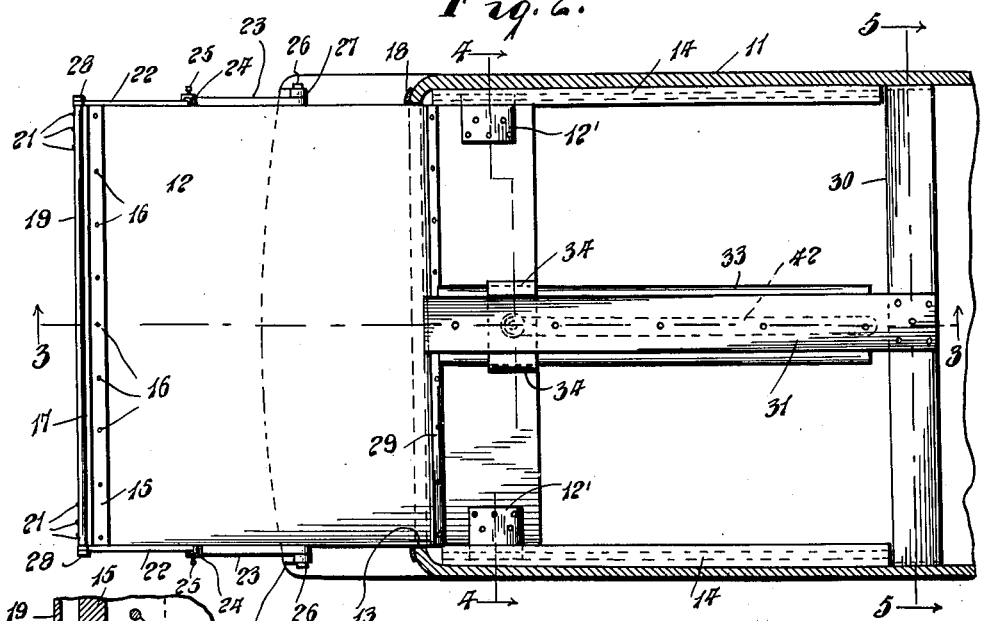
Inventor
Elie A. Ghazal.

Jan. 29, 1935. E. A. GHAZAL 1,989,592
AUTOMOBILE WINDSHIELD GUARD
Filed July 20, 1933   2 Sheets-Sheet 2
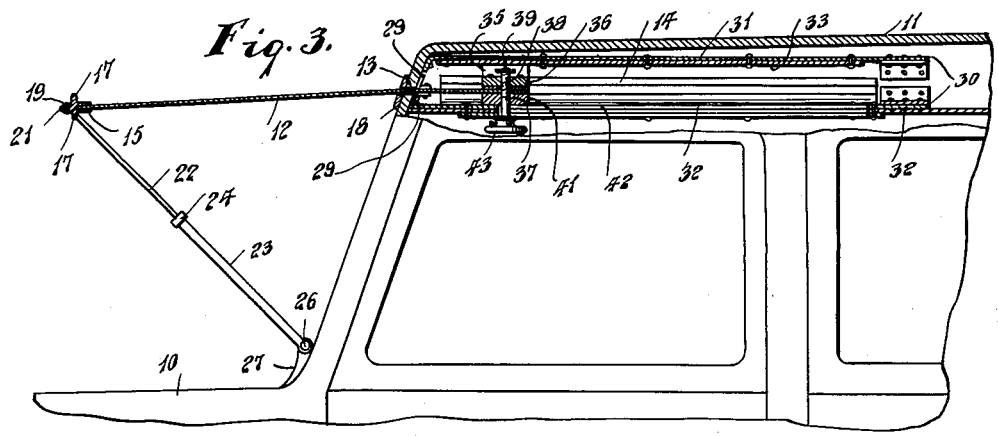
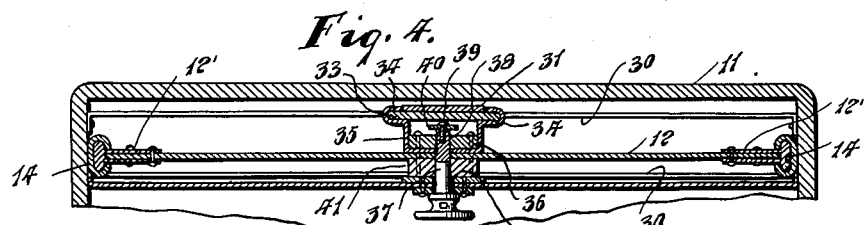
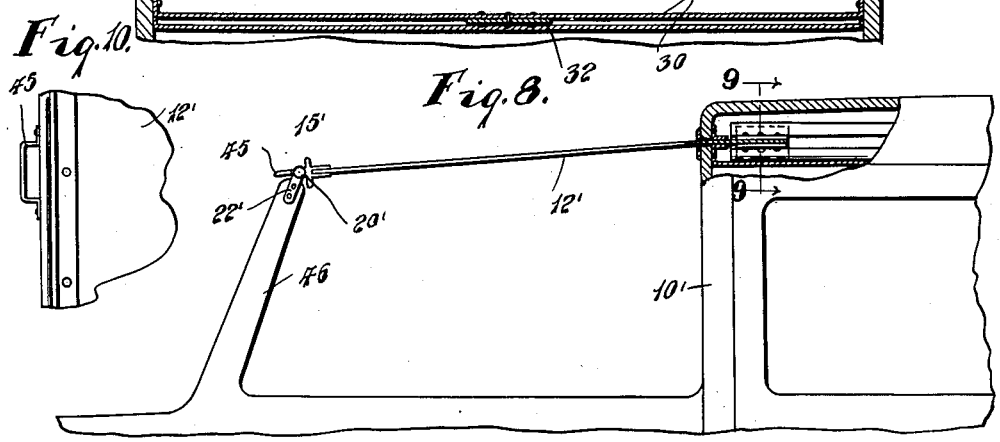
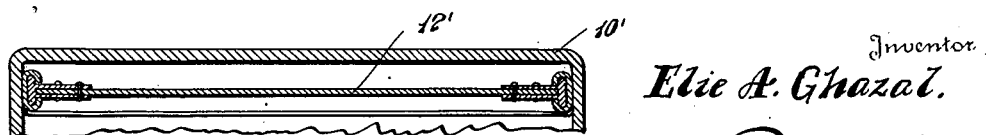
Inventor
Elie A. Ghazal.

Patented Jan. 29, 1935

1,989,592

UNITED STATES PATENT OFFICE 1,989,592

AUTOMOBILE WINDSHIELD GUARD

Elie A. Ghazal, Northampton, Mass.

Application July 20, 1933, Serial No. 681,383

2 Claims. (Cl. 296—95)

This invention relates to an automobile windshield guard primarily designed to prevent rain and snow reaching and freezing on the windshield and rendering driving dangerous as under present conditions, and also to prevent the rays of the sun from reaching and blinding the eyes of the driver.

It is particularly aimed to provide a novel disappearing construction which may be readily moved manually into the desired position from a location within the roof of the automobile.

The more specific objects and advantages will in part be pointed out and otherwise become apparent from a consideration of the description following taken in connection with accompanying drawings illustrating an operative embodiment.

In said drawings:—

Figure 1 is a fragmentary view in side elevation of a closed type of automobile having my improvements applied thereto and in operative position;

Figure 2 is a view of the parts of Figure 1 partly in plan and partly in horizontal section to disclose details;

Figure 3 is a view of the parts of Figures 1 and 2 partly in elevation and partly in longitudinal section to disclose details;

Figure 4 is a cross sectional view taken on the line 4—4 of Figure 2;

Figure 5 is a cross sectional view taken on the line 5—5 of Figure 2;

Figure 6 is a detail section taken on the line 6—6 of Figure 1;

Figure 7 is a detail section taken on the line 7—7 of Figure 6;

Figure 8 is a view partly in side elevation and partly in longitudinal section through a modified form;

Figure 9 is a cross sectional view taken on the line 9—9 of Figure 8, and

Figure 10 is a fragmentary plan view of the visor or shield used in the form of Figure 8.

Referring specifically to the drawings wherein like reference characters designate like or similar parts and first to the form of Figures 1 to 7, 10 designates fragmentarily, the body of an automobile, which may be closed as shown, or open since the invention is applicable to all styles and models. Supported within the top 11 of the automobile is a guard plate or visor 12 of metal or any other preferred material which is slidably mounted through an opening or slot 13 at the front of the roof enabling the visor to be slidably moved into the top or projected forwardly thereof to a desired extent.

Said guard plate 12 within the top, at opposite sides thereof, has T-shaped shoes 12′ riveted or otherwise fastened thereto, whose heads are slidably mounted in the grooves of channel members 14 rigidly fixed to the interior of the automobile.

When the guard 12 is completely disappeared or concealed within the top 11, the slot 13 is closed against the entrance of moisture and air by a closure strip, preferably of metal, as shown at 15, being secured thereto by screws 16 and having flanges 17 above and below the plate 12 in order to engage the frame of the automobile or a gasket 18 of rubber or any desired material, employed if desired, about the slot 13. The closure strip 15 has a round projection 19 thereon which serves as a handle to facilitate the movement of the guard plate 12.

Extending into the hollow of the handle strip 19, at opposite ends of the guard plate 12 are rod members 20, secured in place by screws 21. Pivoted on the rods 20, are supporting links 22 which in turn are telescopically slidable in hollow links 23 having collars 24 at their upper ends effectively mounting screws 25 adapted to bind against the rods 22 to hold them in adjusted positions. The links 23 are pivotally connected by pintles 26 to hinge leaves 27 sutiably fastened to the frame of the automobile. When the guard plate 12 is in a disappeared or inoperative position, links 22 and 23 rest against the windshield frame of the automobile and the former partly telescopes in the latter, with screws 25 loose. Head 28 on the rods 20 prevents detachment of the links 22 from such rods.

In the projected position of the visor or guard plate 12, air and moisture is prevented from entering the opening 13, since angle strips 29 are carried thereby on the upper and lower side adapted for engagement with the automobile frame about the opening 13, such angle members 29 being equipped with felt or other material designed to provide a better and tighter joint.

Means are provided whereby the visor may be secured rigidly in the extended position. To this end, bridge pieces 30, in spaced relation, one above the other, are connected in the roof to the frame of the automobile. Strips 31 and 32 are secured thereto, extending forwardly therefrom and being fastened in any suitable manner to the body of the automobile. Secured to strip 31 is a plate 33, wider than strip 31, engaged at its side edges by channel portions 34 of a bracket 35 which is slidable thereon. Rigidly carried by the bracket 35 is a block 36 in which a screw 37 is threaded at 38, being prevented from falling therefrom by a screw 39 and washer 40. Below the guard plate 12, is a block 41 through which said screw 37 loosely passes, said screw also passing through elongated slots 42 in plate 32 and adjacent parts of the roof of the car. An operating knob 43 is provided on the screws 38. When the visor is in the desired position, the screw 37 will be tightened so that the parts 35 and 41 will be tightened together with head 43, binding such parts against the plate 32 and associated portions of the roof of the car. In Figures 8 to 10 a modified form is shown having a visor 12' similar to that at 12, mounted in the same manner as the visor 12, within the roof of the car, except that the parts 31 to 43 are omitted. A closure 15' substantially similar to that at 15 is connected to the forward edge of visor 12' preferably having a handle 45 attached thereto. The rods 20 are used and element 22' carried by a forward windshield frame 46 is connected to the closure 15' by rods 20', similar to those at 20. In this form of automobile, the driver's seat is arranged between the closed body 10', and the windshield 46.

Various changes may be resorted to provided they fall within the spirit and scope of the invention.

I claim as my invention:—

1. A device of the class described comprising a visor, a frame having spaced apart upper and lower strips, a plate wider than the upper strip and secured thereto with its side edge portions projecting laterally beyond the upper strip, a bracket on the visor having U-shaped portions slidably engaging said edge portions of the plate, a bolt, a block engaging the lowermost strip and through which the bolt passes, said lower strip having an elongated slot through which the bolt also passes, the tightening of the bolt serving to clamp the block and bracket to said strip.

2. A device of the class described comprising a visor, a frame having spaced apart upper and lower strips, a plate wider than the upper strip and secured thereto with its side edge portions projecting laterally beyond the upper strip, a bracket on the visor having U-shaped portions slidably engaging said edge portions of the plate, a bolt, a block engaging the lowermost strip and through which the bolt passes, said lower strip having an elongated slot through which the bolt also passes, the tightening of the bolt serving to clamp the block and bracket to said strip, shoes on the side edge portions of the visor, and channel members within the roof in which the shoes are slidably mounted.

ELIE A. GHAZAL.